US010313489B2

(12) United States Patent
Singh et al.

(10) Patent No.: US 10,313,489 B2
(45) Date of Patent: Jun. 4, 2019

(54) USB TO COAX BRIDGE

(71) Applicant: Entropic Communications, LLC, Carlsbad, CA (US)

(72) Inventors: Inderjit Singh, San Diego, CA (US); Branislav Petrovic, La Jolla, CA (US)

(73) Assignee: Entropic Communications, LLC, Carlsbad, CA (US)

( * ) Notice: Subject to any disclaimer, the term of this patent is extended or adjusted under 35 U.S.C. 154(b) by 0 days.

(21) Appl. No.: 15/832,997

(22) Filed: Dec. 6, 2017

(65) Prior Publication Data

US 2018/0109653 A1    Apr. 19, 2018

Related U.S. Application Data

(63) Continuation of application No. 14/302,152, filed on Jun. 11, 2014, now Pat. No. 9,871,892.

(60) Provisional application No. 61/933,700, filed on Jan. 30, 2014.

(51) Int. Cl.
| | |
|---|---|
| *H04L 12/46* | (2006.01) |
| *H04L 29/06* | (2006.01) |
| *H04L 12/947* | (2013.01) |
| *H04L 12/741* | (2013.01) |
| *H04L 12/28* | (2006.01) |
| *H04L 12/749* | (2013.01) |

(52) U.S. Cl.
CPC .......... *H04L 69/08* (2013.01); *H04L 12/2801* (2013.01); *H04L 12/2838* (2013.01); *H04L 45/74* (2013.01); *H04L 45/741* (2013.01); *H04L 49/25* (2013.01)

(58) Field of Classification Search
CPC .. H04L 12/2801; H04L 12/2838; H04L 45/74
See application file for complete search history.

(56) References Cited

U.S. PATENT DOCUMENTS

| | | | |
|---|---|---|---|
| 6,067,591 A | 5/2000 | Howard et al. | |
| 6,529,520 B1 | 3/2003 | Lee et al. | |
| 7,817,642 B2 * | 10/2010 | Ma ..................... | H04N 21/4182 370/395.4 |
| 8,591,264 B2 | 11/2013 | Binder | |
| 2003/0066082 A1 * | 4/2003 | Kliger ................. | H04L 12/2801 725/80 |
| 2008/0117919 A1 * | 5/2008 | Kliger ..................... | H04L 69/10 370/400 |
| 2008/0247541 A1 | 10/2008 | Cholas et al. | |
| 2008/0279219 A1 * | 11/2008 | Wu ......................... | H04L 45/00 370/474 |
| 2011/0069605 A1 | 3/2011 | Laudel et al. | |

(Continued)

*Primary Examiner* — Khaled M Kassim
*Assistant Examiner* — Zhaohui Yang
(74) *Attorney, Agent, or Firm* — McAndrews, Held & Malloy, Ltd.

(57) ABSTRACT

A USB-to-coaxial network bridging system and method includes receiving data frames from a USB or FireWire device via a corresponding USB or FireWire communication interface, wherein the received data frames are intended for transmittal to a predetermined remote device on a coaxial network; combining the received data frames into an aggregated frame and addressing the aggregated frame to allow the aggregated frame to be routed to the predetermined remote device on the coaxial network; and sending the aggregated frame to the remote device over the coaxial network.

20 Claims, 10 Drawing Sheets

(56) References Cited

U.S. PATENT DOCUMENTS

2011/0173435 A1* 7/2011 Liu .................. H04L 63/061
                                              713/150
2013/0089125 A1  4/2013 Kim
2013/0128825 A1* 5/2013 Gallagher ............ H04W 28/26
                                              370/329

* cited by examiner

USB TO COAX BRIDGE

CROSS-REFERENCE TO RELATED APPLICATIONS

This application is a continuation of U.S. application Ser. No. 14/302,152 filed Jun. 11, 2014, which claims the benefit of U.S. Provisional Application No. 61/933,700, which was filed on Jan. 30, 2014. These applications are hereby incorporated herein by reference in their entirety.

TECHNICAL FIELD

The disclosed technology relates generally to network communications, and more particularly, some embodiments relate to systems and methods for network bridging multiple different networks.

DESCRIPTION OF THE RELATED ART

A local network typically includes several types of devices configured to share information across the network. For example, one type of local network can be Configured to deliver subscriber services throughout a home, office or other like environment. These subscriber services can include delivering multimedia content, such as streaming audio and video, to devices located throughout the location. As the number of available subscriber services has increased and they become more popular, the number of devices being connected in the home network has also increased.

The network of FIG. 1 is one example of a multimedia network implemented in a home or office. In this example, a wired communications medium 100 is shown. The wired communications medium might be a coaxial cable system, a power line system, a fiber optic cable system, an Ethernet cable system, or other similar communications medium. Alternatively, the communications medium might be a wireless transmission system. As one example of a wired communication medium, with a Multimedia over Coax Alliance (MoCA®) network, the communications medium 100 is coaxial cabling deployed within a residence 101 or other environment. The systems and methods described herein are often discussed in terms of this example coaxial network application, however, after reading this description, one of ordinary skill in the art will understand how these systems and methods can be implemented in alternative network applications as well as in environments other than the home.

The network of FIG. 1 comprises a plurality of network nodes 102, 103, 104, 105, 106 in communication according to a communications protocol. For example, the communications protocol might conform to a networking standard, such as the well-known MoCA standard. Nodes in such a network can be associated with a variety of devices. For example, in a system deployed in a residence 101, a node may be a network communications module associated with one of the computers 109 or 110. Such nodes allow the computers 109, 110 to communicate on the communications medium 100. Alternatively, a node may be a module associated with a television 111 to allow the television to receive and display media streamed from one or more other network nodes. A node might also be associated with a speaker or other media playing devices that plays music. A node might also be associated with a module configured to interface with an internet or cable service provider 112, for example to provide Internet access, digital video recording capabilities, media streaming functions, or network management services to the residence 101. In addition, televisions 107, set-top boxes 108 and other devices may be configured to include sufficient functionality integrated therein to communicate directly with the network.

With the many continued advancements in communications technology, more and more devices are being introduced in both the consumer and commercial sectors with advanced communications capabilities. Many of these devices are equipped with communication modules that can communicate over the wired network (e.g., over a MoCA Coaxial Network) as well as modules that can communicate over fiber or other networks as well. Indeed, in many environments, it is becoming more commonplace for there to be multiple networks, and sometimes multiple different networks, across which a user may wish the network devices to communicate. In such circumstances, network bridges can be used to allow devices to communicate across multiple networks.

Network bridging is a technique for allowing two or more communication networks or network segments to be aggregated. In some cases, the aggregated segments can be combined to form a virtual network. Bridging typically relies on a network bridge to connect the multiple networks or network segments. The network bridge can be configured to bridge the protocols between the two segments or networks, allowing devices on one network to communicate with devices on the other networks, despite differences that may exist in specifications of their respective MAC or PHY layers. That is, network bridging can be used to aggregate networks of the same type as well as aggregate disparate networks.

Home media and other devices often include I/O interfaces such as for example, standardized interfaces like USB, FireWire, and the like. These devices may also include an Ethernet port for Ethernet network connectivity. Examples of such devices can include, mobile/smartphones, desktop, laptop and tablet computers, televisions, media players, and so on. USB devices often run applications that, from time to time, require one USB device to communicate with another USB device via their respective USB ports. However, is sometimes desired that one USB device connect with another USB device located in a different room or location or that is not easily accessible for frequent use. Accordingly, such devices need to be relocated so that they can be connected to one another via a USB cable between the two.

BRIEF SUMMARY OF EMBODIMENTS

According to various embodiments of the disclosed technology, systems and methods are provided for bridging a USB-compatible or FireWire-compatible device to a coaxial network. This bridging can be implemented to open the MoCA connectivity to CE devices, Laptops, tablets, TVs, Computers, home media servers, gaming consoles and other devices having standardized interfaces such as USB and FireWire, which can use the in home networking, and a reliable connection to Internet, using high speed and high reliability MoCA network. Also, configurations can be implemented such that for USB and FireWire enabled devices, the users don't need to externally provide power, or route power to the bridge. For example, the USB interface is able to provide power to the bridge, allowing a plug and play experience and flexible mounting options for the bridge. Users can use USB 1, 2, 2.1, 3 and future versions, or FireWire's past and future versions. Additionally, a bridge can be split and shared among multiple USB devices using USB hubs or FireWire hubs, and multiple devices can be connected to 1 MoCA tap. This bridging can also open the MoCA API such that programmers can develop Android, Windows, iOS and other applications that run over MoCA home network, and provide connectivity among nodes.

In some embodiments, systems and methods for transferring data from a USB-compatible device that is not otherwise compatible with a coaxial network, across the coaxial network to a remote device, include: a first USB compatible device partitioning data into a plurality of frames, and sending the frames via a USB interface of the first USB compatible device to a first USB-to-coaxial network bridge; the first USB-to-coaxial network bridge receiving the data frames sent from the first USB compatible device via a USB communication interface, wherein the received data frames are intended for transmittal to a predetermined remote device on a coaxial network; the first USB-to-coaxial network bridge combining the received data frames into an aggregated frame and addressing the aggregated frame to allow the aggregated frame to be routed to the predetermined remote device on the coaxial network; and the first USB-to-coaxial network bridge sending the aggregated frame to the remote device over the coaxial network.

In various embodiments, the remote device may be a second USB-compatible device that is not otherwise compatible with a coaxial network, or it may be a coaxially-connected device such as, for example, a television set connected through an Ethernet-coaxial bridge or set-top box. In embodiments in which the remote device is a second USB-compatible device, systems and methods can include a second USB-to-coaxial network bridge receiving the aggregated frame from the first USB-to-coaxial network bridge, and routing individual frames contained in the aggregated frames to the second USB device.

In various further embodiments, routing individual frames contained in the aggregated frames to the second USB device comprises removing a coaxial network header from the aggregated frame, de-aggregating individual frames contained in the aggregated frame, reading address information associated with the de-aggregated individual frames, and transmitting the de-aggregated individual frames to the second USB device based on the address information.

In still further embodiments systems and methods can be implemented in which the first USB-to-coaxial network bridge identifies, based on header information in the received frames, an identification of the remote device and, wherein the addressing comprises, and based on this identification, addresses the aggregated frame to the remote device using addressing protocols of the coaxial network. The USB-to-coaxial network bridge can also be implemented such that addressing includes adding a coaxial network frame header to the aggregated frame, the coaxial network frame header including an IP or MAC address of the predetermined remote device.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

The technology disclosed herein is directed toward systems and methods for bridging USB-capable devices with a communications network such that USB devices can communicate with one another across a non-USB communication network, or with other non-USB devices on the non-USB communication network.

From time to time, the disclosure provided herein is described in terms of bridging USB devices with a MoCA network. After reading this description, one of ordinary skill in the art will understand how the technology disclosed herein can be applied to bridging USB devices to other networks or network types, or to bridging other non-network interface devices such as, for example, FireWire devices, to a communication network.

Figure 1:
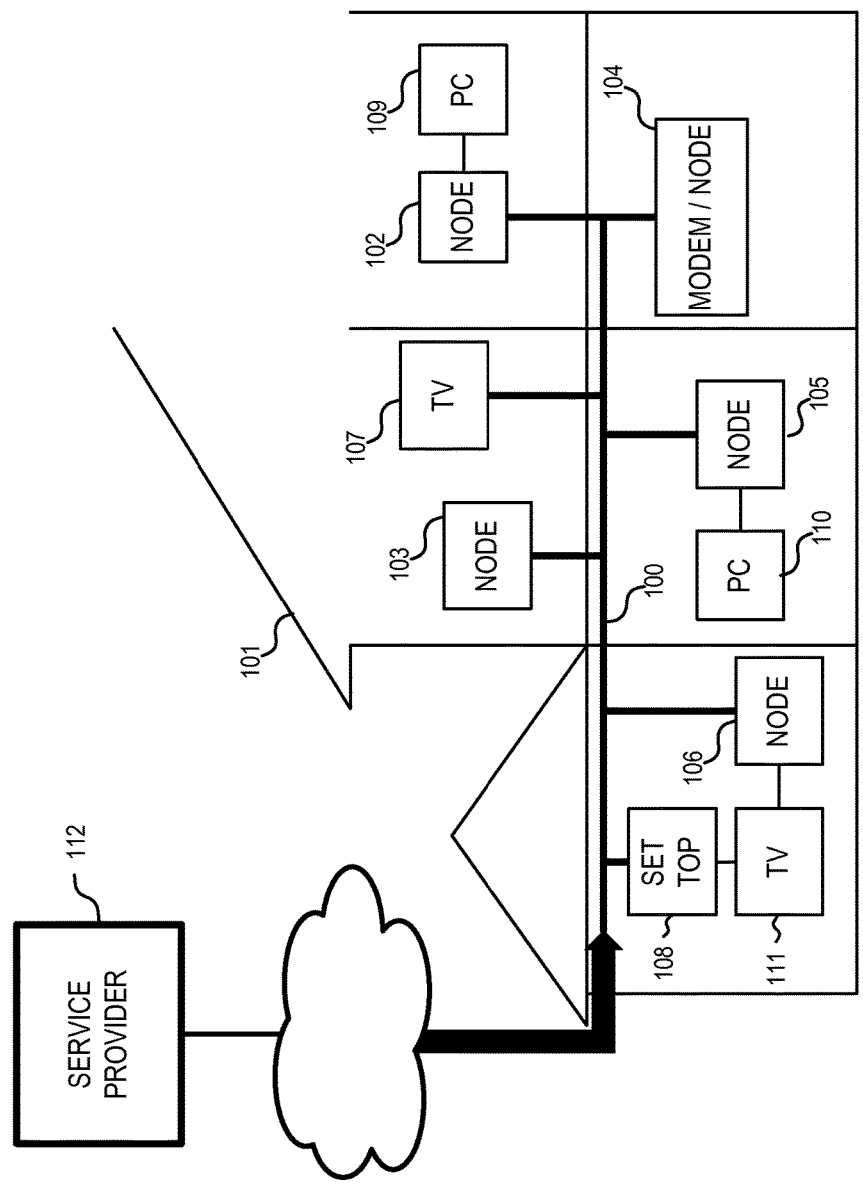
FIG. 1 is a diagram illustrating one example of a home network environment with which the systems and methods described herein can be implemented.
Figure 2:
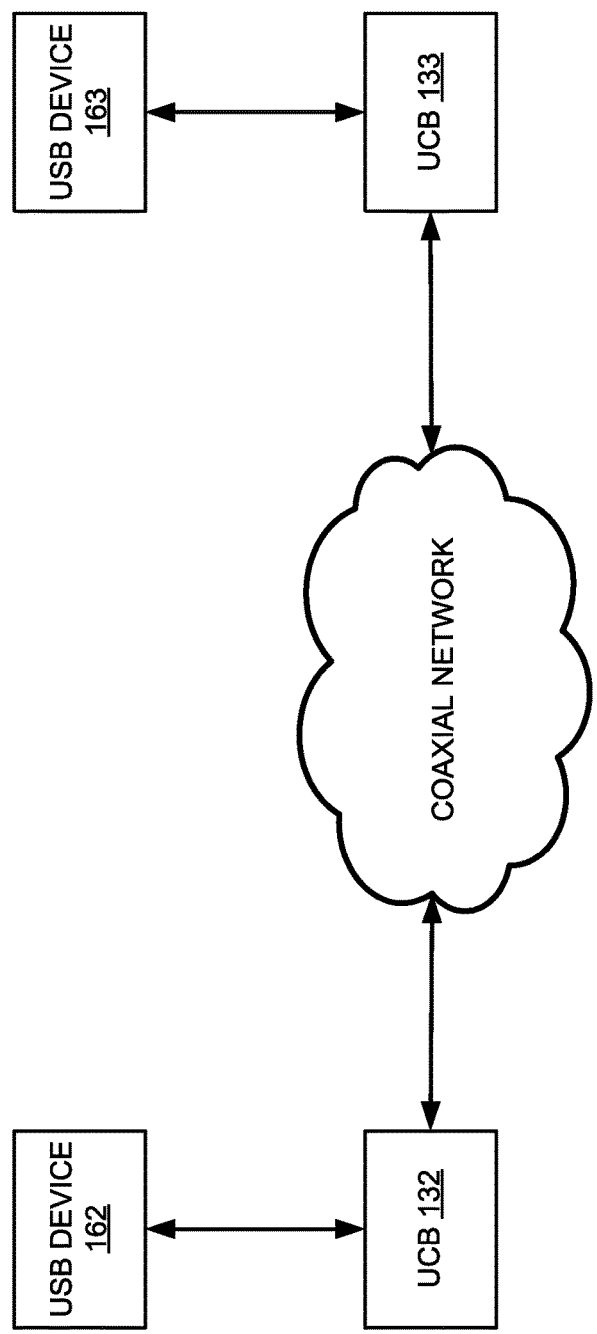
FIG. 2 is a diagram illustrating an example implementation of a bridging device in accordance with one embodiment of the systems and methods described herein.

FIG. 2 is a diagram illustrating an example implementation of a bridging device in accordance with one embodiment of the systems and methods described herein. Particularly, the example illustrated in FIG. 2 depicts the implementation of a USB-to-coaxial bridge they can be implemented to allow interoperability between USB devices and a coaxial networks such as, for example, the MoCA network. Referring now to FIG. 2, this example illustrates 2 USB devices 162, 163 configured to communicate with one another over a coaxial network 144 via their corresponding USB-to-coaxial bridges 132, 133.

To illustrate the operation of the technology disclosed herein at a high level consider a first example in which USB device 162 is intending to transmit data to USB device 163. Further assume that USB devices 162 and 163 are located in different rooms or in locations otherwise making it inconvenient or impossible to connect them using standardized USB cabling. However, you must be devices 162 163 may each be located within a convenient distance of an access point to coaxial network 144. Accordingly, in this scenario, a USB device 162 can be configured to communicate the data to be transmitted to USB-to-coaxial bridge 132 for transmission to USB device 163 across coaxial network 144. USB-to-coaxial bridge 132 can be configured to translate the data packets received from USB device 162 into data packets compatible with coaxial network 144. USB-to-Coax bridge 132 negotiates for communications bandwidth with the coaxial network controller, and at the allocated time, sends the data packets across coaxial network 144 to the intended device. In some instances, the intended device may be a MoCA device or other device compatible with coaxial network 144, while in other embodiments the intended device may be USB device 163. In the latter case, the data packets are sent across coaxial network 144 to USB-to-Coax bridge 133, which receives the packets, reformats them into a packet type expected by USB device 133 and sends the reformatted packets to USB device 133. Accordingly, as this example serves to illustrate, USB-to-Coax bridge 132, 133 can be used to bridge USB devices with a coaxial network such as, for example, a MoCA network.

Before describing the technology in further detail, it is useful to describe an example article of equipment with which the technology can be implemented. One such example is that of a USB device (e.g., a USB device 161 or 162) with communication interfaces interfaces such as that shown in FIG. 3. After reading this description, one of ordinary skill in the art will appreciate that the technology disclosed herein can be used with any of a number of different devices or equipment having various communication capabilities, including a FireWire interface in addition to or in place of the USB interface.

Figure 3:
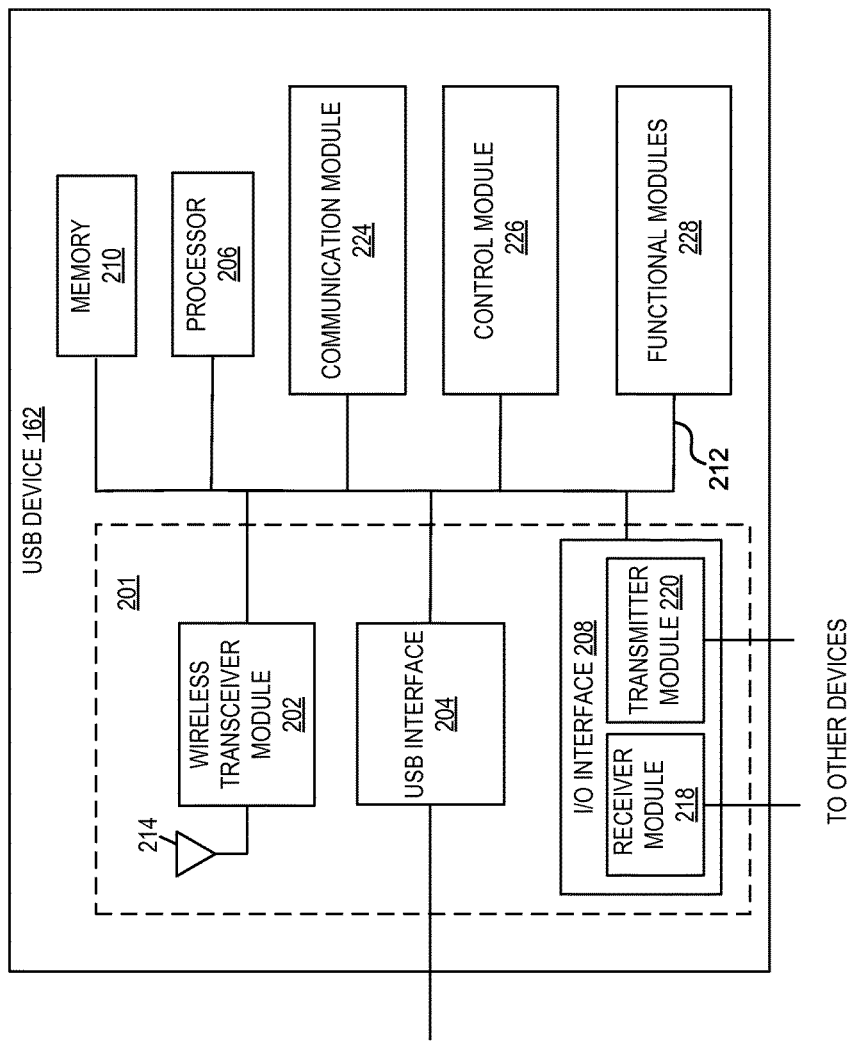
FIG. 3 is a diagram illustrating one example of a USB device (e.g., a USB device 161 or 162) that can be connected to a coaxial network using a USB-coaxial bridge in accordance with embodiments of the technology disclosed herein.

With reference now to FIG. 3, in this example application, the example USB device 162 includes a communication module 201, a processor 206 (which can include multiple processors or processing units), and memory 210 (which can include memory units or modules of different types). These components are communicatively coupled via a bus 212 over which these modules may exchange and share information and other data. Communication module 201 includes wireless transceiver module 202, a USB communications interface module 204, and an I/O interface module 208.

An antenna 214 is coupled to wireless transceiver module 202 and is used by wireless transceiver module 202 to transmit radio signals wirelessly to wireless equipment with which it is connected. These RF signals can include information of almost any sort that is sent or received by USB device 162 to/from other entities. For example, in the case of a laptop this can include files such as downloaded music, movies or other audio and video content.

The wireless communications implemented using communication module 201 can be implemented according to a number of different wireless protocols, including standardized protocols. Examples of such standardized protocols include Bluetooth®, HiperLan, and various IEEE 802.11 communications standards, although other communication interfaces (whether or not standardized) can be implemented.

A USB interface module 204 is also provided to allow the device to communicate with other USB-capable devices via the standardized USB interface. The USB interface transfers signal and power over a four-wire cable with endpoint connections defined by the USB standard (e.g., the USB 3.1 standard). Although not illustrated in FIG. 3, the USB device 162 would typically also include a standardized USB connector that can be used to connect the USB device 162 to other USB devices using standardized USB cabling.

An I/O interface module 208 is provided in the illustrated example, and can be configured to couple USB device 162 to other network nodes. These can include nodes or equipment. In this example architecture, the I/O interface module 208 includes a receiver module 218 and a transmitter module 220. Communications via the I/O interface module can be wired or wireless communications, and the transmitter and receiver contained therein can include line drivers and receivers, radios, antennas or other items, as may be appropriate for the given communication interfaces. Transmitter module 220 may be configured to transmit signals that can include voice, data and other communications. These may be sent in a standard network protocol if desired. Receiver module 218 is configured to receive signals from other equipment. These signals can include voice, data and other communications from the the other equipment, and can also be received in a standard network protocol if desired. In terms of the above examples of an MFP or digital camera, I/O interface 208 can provide a hardwired complementary interface to the wireless interface described above. This may be, for example, an Ethernet interface, a FireWire interface, but as anor other hardwired interface.

Memory 210, can be made up of one or more modules of one or more different types of memory, and in the illustrated example is configured to store data and other information 224 as well as operational instructions that may be used by the processor to operate USB device 162. The processor 206, which can be implemented as one or more cores, CPUs, DSPs, or other processor units, for example, is configured to execute instructions or routines and to use the data and information in memory 210 in conjunction with the instructions to control the operation of the USB device 162. For example, image-processing routines, such as compression routines, can be stored in memory 210 and used by processor 206 to compress image files from raw files into JPEG files.

Other modules can also be provided with the USB device 162 depending on the equipment's intended function or purpose. A complete list of various additional components and modules would be too lengthy to include, however a few examples are illustrative. For example, a separate communication module 224 can also be provided for the equipment to manage and control communications received from other entities, and to direct received communications as appropriate. Communication module 224 can be configured to manage communication of various information sent to and received from other entities. Communication module 224 can be configured to manage both wired and wireless communications.

A separate control module 226 can be included to control the operation of USB device 162. For example, control module 226 can be configured to implement the features and functionality of USB device 162. Functional modules 228 can also be included to provide equipment functionality. For example, in the case of an MFP, various modules (which may include various forms of hardware and software) can be provided to perform printing, scanning, faxing, and copying operations of the device. In the case of a laptop computer, functional modules 228 can include modules such as, for example, disk drive modules, solid-state drives, software applications, and so on, and so on. Again, as these examples illustrate, one of ordinary skill in the art will appreciate how other modules and components can be included with USB device 162 depending on the purpose or objectives of the equipment.

Having thus described an example device with which the technology may be implemented, the technology disclosed herein may from time-to-time described herein in terms of this example application. Description in terms of this environment is provided to allow the various features and embodiments of the invention to be portrayed in the context of an exemplary application. After reading this description, it will become apparent to one of ordinary skill in the art how the invention can be implemented in different and alternative environments and applications.

Figure 4A:
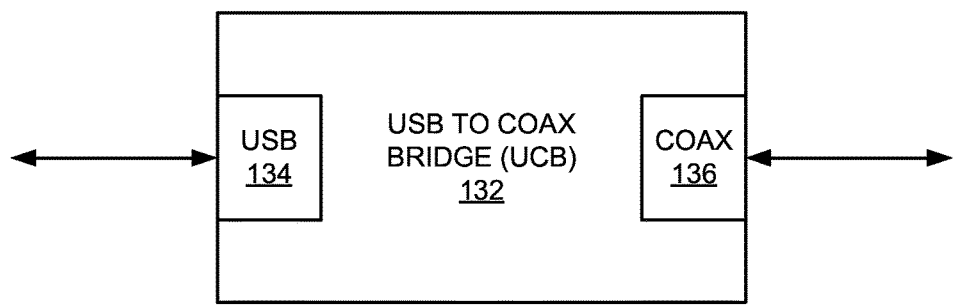
FIG. 4A is a diagram illustrating an example Coaxial bridge 132 in accordance with one embodiment of the systems and methods described herein.

FIG. 4A is a diagram illustrating an example USB-to-Coax bridge 132 in accordance with one embodiment of the systems and methods described herein. As illustrated in FIG. 4A, USB-to-coax bridge 132 includes a USB interface 134 in a coaxial interface 136. As described in more detail below, USB-to-coax bridge 132 can be configured to provide a bridge between USB devices and the coaxial network such as, for example, a MoCA network. A more detailed description of an example implementation of a USB-to-coax bridge 132 is provided below with reference to FIGS. 4B and 7.

Figure 4B:
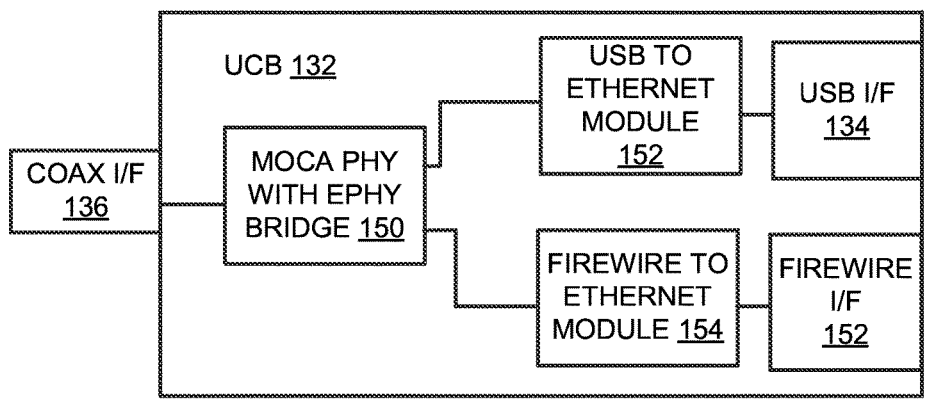
FIG. 4B is a diagram illustrating another example Coaxial bridge 132 in accordance with one embodiment of the systems and methods described herein.

FIG. 4B is a diagram illustrating another example Coax bridge 132 in accordance with one embodiment of the systems and methods described herein. In the example illustrated in FIG. 4B, the coaxial bridge 132 includes the capability to bridge either or both a USB device and a FireWire device to a coaxial network. This is similar to the device illustrated in FIG. 4A, but with the added capability of bridging not only a USB device to the network but also a FireWire device. Referring now to FIG. 4B, this example also includes a coaxial network interface 136 and a USB interface 134. In addition, this example includes a FireWire interface 152 to allow USB-to-coaxial network bridge 132 2 bridge to FireWire-capable devices. To accommodate this, a USB to Ethernet module 152 can be included to provide the interface and protocol conversions to allow the bridge to interface to USB devices. Likewise, a FireWire to Ethernet module 154 can be included to provide the interface and protocol conversions to allow the bridge to interface with FireWire devices. Similarly, a mocha/Ethernet PHY bridge 150 can be provided to bridge the physical layers between the coaxial network and the USB and FireWire networks.

For ease of discussion, this document is generally drafted to refer to a USB-to-coaxial network bridge as an example implementation. As will become apparent to one of ordinary skill in the art after reading this description, a USB-to-coaxial network bridge (e.g., USB-to-coaxial network bridge 132) can be implemented as a FireWire-to-coaxial network asked bridge, a USB-to-coaxial network bridge, or a combined FireWire/USB-to-coaxial network bridge. As will also become apparent to one of ordinary skill in the art after reading this description, such a bridge can be implemented to provide bridging between a coaxial network and virtually any standardized communication interface such as, for example, USB, FireWire, and so on.

In various embodiments, the bridge can be implemented as an extra dongle that can be connected to an existing coaxial wall plate or other coaxial network interface. In alternative embodiments, the bridge can be implemented as an in-wall plate that can provide one or more connections for a standardized interface such as USB or FireWire. This can allow plug-and-play connectivity such that the user can simply connect his or her USB or FireWire device directly to the wall plate using a standardized USB or FireWire interface cable (or other standardized interface). The bridge can be implemented to connect with any of a number of coaxial network types including, mocha, for example. This can be used to leverage the existing coaxial cable network in the home, office, or other environment. Accordingly, the otherwise relatively short range or limited connectivity of standardized interfaces such as USB and FireWire can be extended to span a bridge coaxial network, allowing connectivity of USB and FireWire devices from room to room, floor to floor, and so on.

Figure 5:
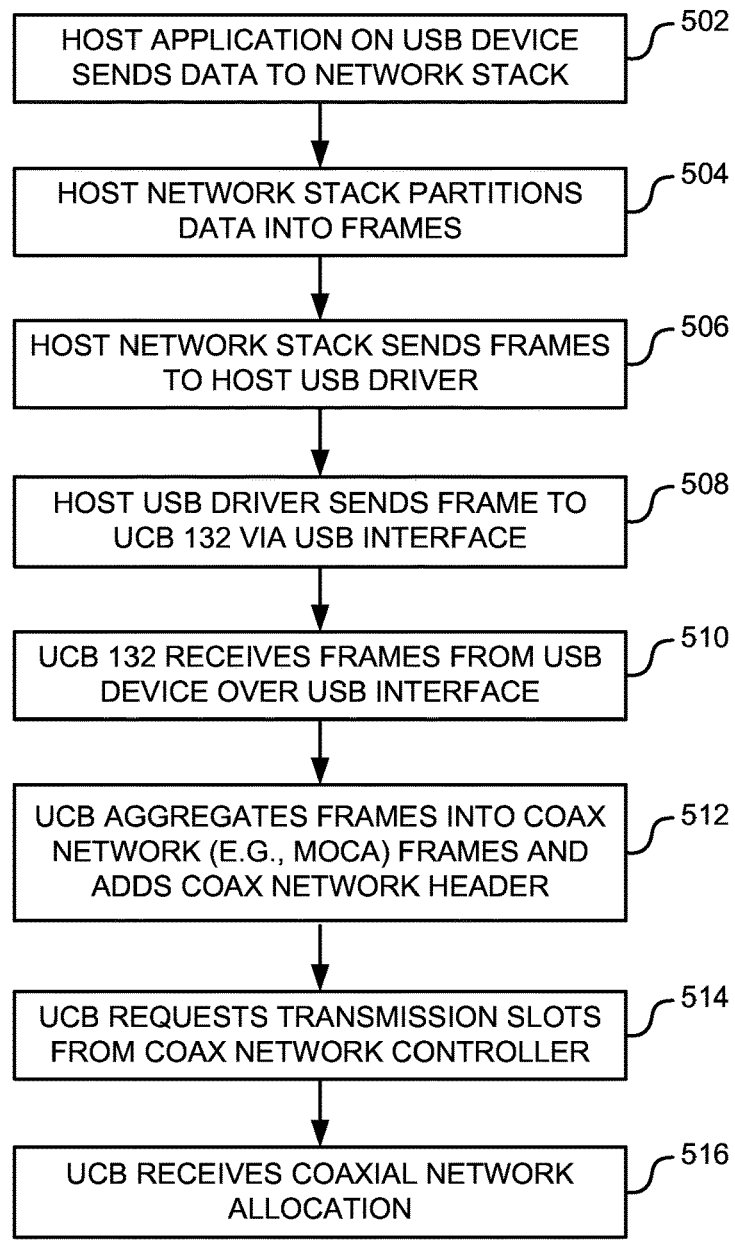
FIGS. 5 and 6 are operational flow diagrams illustrating an example process for bridging USB devices with a coaxial network in accordance with one embodiment of the systems and methods disclosed herein.
Figure 6:
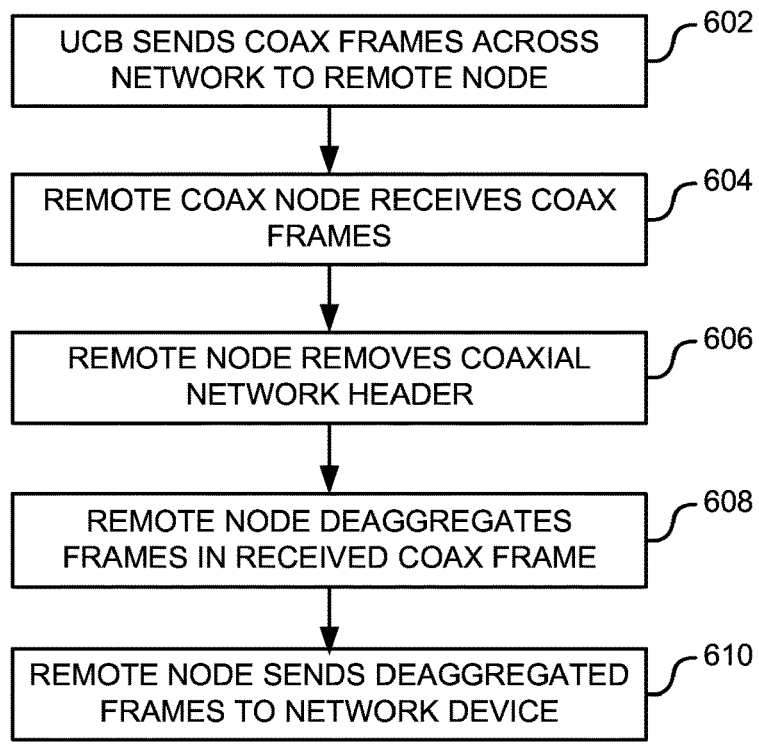

FIGS. 5 and 6 are operational flow diagrams illustrating an example process for bridging USB devices with a coaxial network in accordance with one embodiment of the systems and methods disclosed herein. Particularly, FIGS. 5 and 6 are operational flow diagrams illustrating an example in which a USB-to-coax bridge such as, for example, USB-to-coax bridge 132, receives data from a USB device can communicate their data over a coaxial network to a remote node on the coaxial network. At operation 502 a host application on the sending USB device determines that it has data to send to a remote node. The data can be, for example, any of a number of different types of data or content. For example, the sending USB device may be a computer that receives video content via the Internet and the application has been instructed to send video content to a nether device across the coaxial network.

In this example, the host application sends the data to be transmitted to a network stack. The network stack partitions the data into packets or frames suitable for transmission via the device's USB port and sends those frames to the host USB driver. This is illustrated at operations 504 and 506. At operation 508, the host USB driver since the frames to the USB-to-coax bridge via the USB interface.

At operation 510, the USB-to-coax bridge receives the frames from the USB device over the USB interface. For example, the USB-to-coax bridge may receive the frames via USB port 134 (FIG. 4). At operation 512, the USB-to-coax bridge aggregates the received frames into one or more coaxial network frames and adds a coaxial network header to each coaxial network frame. For example, in the case of a MoCA network, the USB-to-coax bridge aggregates received USB packets (e.g., Ethernet packets) into one or more MoCA packets and adds a MoCA header for routing across the MoCA network. For example, in some embodiments, the bridge can be configured to identify, based on header information in the received frames, an identification of the predetermined remote device and to use this identification to address the aggregated frame to the predetermined remote device using addressing protocols of the coaxial network.

At operation 514, the USB-to-coax bridge makes a reservation request to send the aggregated packet or packets across the coaxial network. For example, the USB-to-coax bridge requests transmission slots from the network controller according to the network's standard MAC protocol.

Once the USB-to-coax bridge receives the bandwidth allocation from the network controller, it sends the aggregated frames across the coaxial network to the remote node. This is illustrated at operations 516 and 602. The remote node receives the network packet, removes the coaxial network header, and deaggregates the received frames to recover the original USB-compatible frames sent by the sending USB device. This is illustrated at operations 604, 606 and 608. At operation 610, the remote node sends the deaggregated frames to the network device via its USB interface (e.g. USB interface 134). In various embodiments, this routing can include removing a coaxial network header from the aggregated frame, de-aggregating individual frames contained in the aggregated frame, reading address information associated with the deaggregated individual frames, and transmitting the de-aggregated individual frames to a USB device associated with the address information.

Figure 7:
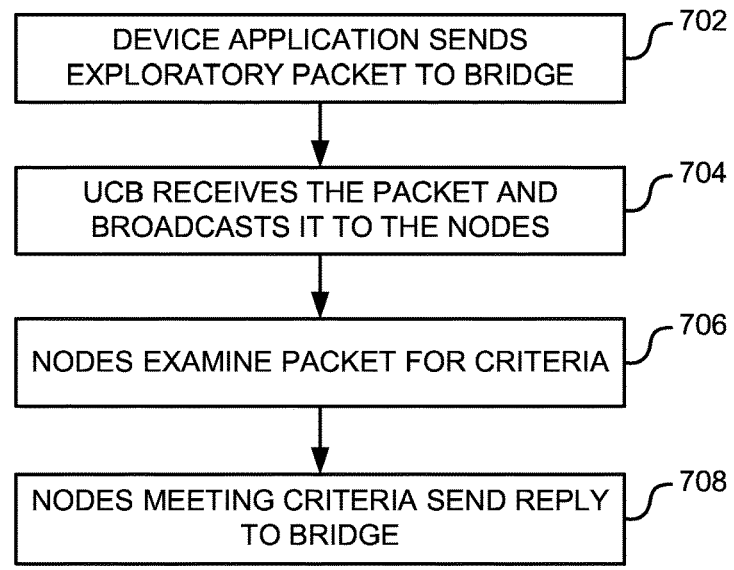
FIG. 7 is a diagram illustrating an example process for network exploration via a USB-to-coax bridge.

In various embodiments, the USB-to-coax bridge can be configured to work in conjunction with USB device to explore the network. FIG. 7 is a diagram illustrating an example process for network exploration via a USB-to-coax bridge. In this example, at operation 702, when a USB device connects to the USB-to-coax bridge the first time, it sends an initial ping with and exploratory packet. This can, for example, comprise an address resolution protocol (ARP) probe packet that can be used to probe the network devices.

At operation 704, the USB-to-coax bridge receives the packet, reformatted for the coaxial network, and broadcasts the packet across the coaxial network. For example, in one embodiment, the USB-to-coax bridge broadcasts the packet to every node on the coaxial network and waits for a reply. At operation 706, the receiving nodes examined the packet to determine whether they meet the criteria set forth in the packet. At operation 708, nodes that meet the criteria reply to the USB-to-coax bridge, and the USB-to-coax bridge learns (and stores) which node is the appropriate node for a given transmission. If multiple remote nodes reply, the system can be configured to allow a negotiation between the replying remote nodes so that one can be elected for these communications.

As the above example serves to illustrate, in various embodiments, the ARP packet includes sufficient information to enable receiving devices to determine whether they meet the criteria sought by the exploring device. For example, a new computer being added to the coaxial network via the USB-to-coax bridge interface may desire to access the Internet or locate a particular URL. The USB-to-Coax bridge connected to the exploring USB device broadcasts the packet to the member nodes on the coaxial network. If a network node (e.g., a gateway) receives the packet, and knows that the URL requested is an Internet URL, and knows that it can access the Internet, that network node sends a response back to the USB-to-coax bridge. The USB-to-coax bridge now knows that it is connected to a computer on the USB-to-coax bridge side and that there is a gateway on the other side. Accordingly, the USB-to-coax bridge can be used to explore the topology of the network.

As another example, consider a high definition television connected to a MoCA network. Television has an IP address on the network. A computer connected to the USB port of a USB-to-coax bridge also has an IP address. Where the computer is looking to stream video it can connect, explore the network, and learn which devices on the network can stream video (or learn other capabilities of devices on the network). Accordingly, when an application on the computer selects a television to which to stream video, the application knows the IP and MAC addresses for that television. In this example, the computer can be configured to stream the video in Ethernet frames with the appropriate MAC and IP addresses for the television. When these packets reach the USB-to-coax bridge, the UCP reads the Mac address and adds the appropriate MoCA header. The USB-to-coax bridge then forwards the original payload with a MoCA header across the MoCA network. The MoCA header is used to route the packet to the appropriate node (e.g., the designated TV or its associated set-top box), and that node unpacks the Internet content from the MoCA packet.

Although the above processes of FIGS. 5, 6 and 7 are described in terms of USB frames, one of ordinary skill in the art will understand after reading this description how a coaxial bridge can be implemented to bridge a FireWire or other like standard interface to the coaxial network. For example, a FireWire bridge can be implemented to aggregate FireWire frames into a mocha packet for communication across a mocha network and the aggregate the frames at the receiving end.

Figure 8:
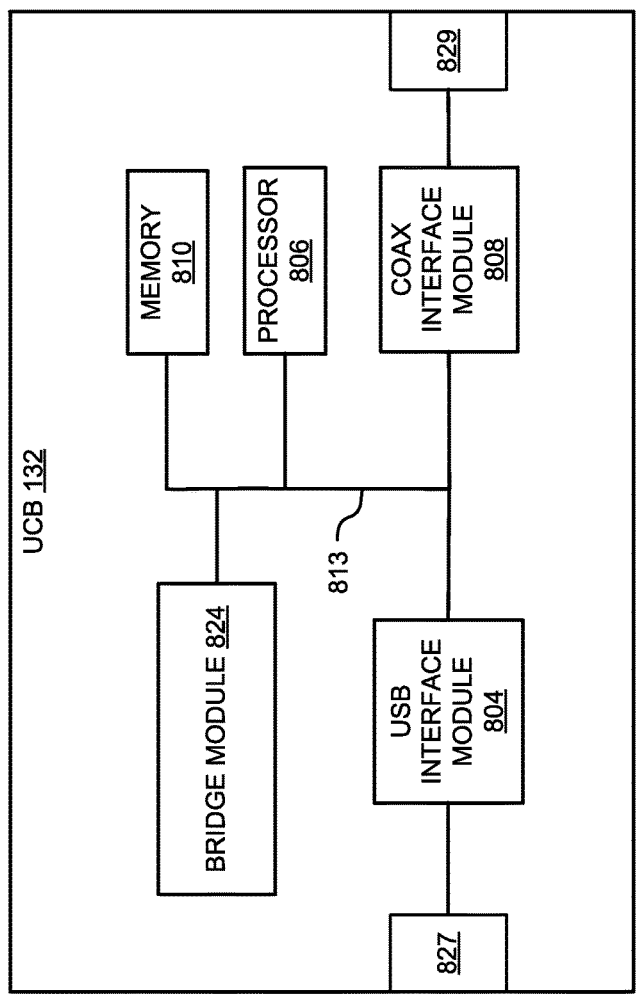
FIG. 8 is a diagram illustrating an example implementation of a USB-to-coax bridge in accordance with one embodiment of the systems and methods described herein.

FIG. 8 is a diagram illustrating an example implementation of a USB-to-coax bridge in accordance with one embodiment of the systems and methods described herein. Referring now to FIG. 8, this example USB-to-coax bridge 132 includes a memory 810, a processor 806, a bridge module 824, a USB interface module 804, a coaxial network interface module 806, a USB connector 827, and a coaxial connector 829. These components in this example are communicatively coupled via a bus 813 over which these modules may exchange and share information and other data.

Memory 810, can be made up of one or more modules of one or more different types of memory, and in the illustrated example is configured to store data and other information as well as operational instructions that may be used by the processor to operate USB-to-coax bridge 132. The processor 806, which can be implemented as one or more cores, CPUs, DSPs, or other processor units, for example, is configured to execute instructions or routines and to use the data and information in memory 810 in conjunction with the instructions to control the operation of the USB-to-coax bridge 132. For example, bridge communications routines, such as packet aggregation and de-aggregation routines, can be stored in memory 810 and used by processor 806 to convert packets from USB to MoCA and vice versa.

A separate bridge module 824 can be included to control the operation of USB-to-coax bridge 132. For example, bridge module 824 can be configured to implement the features and functionality of USB-to-coax bridge 132.

A USB interface module 804 is also provided to allow the USB-to-coax bridge to communicate with USB-capable devices via the standardized USB interface using a standardized USB connector 827. Likewise, the coaxial network interface module 808 is provided to allow the USB-to-coax bridge to communicate with the coaxial network. Inappropriate coaxial cable connector 829 is also shown to provide the physical interface to the coaxial network.

Figure 9:
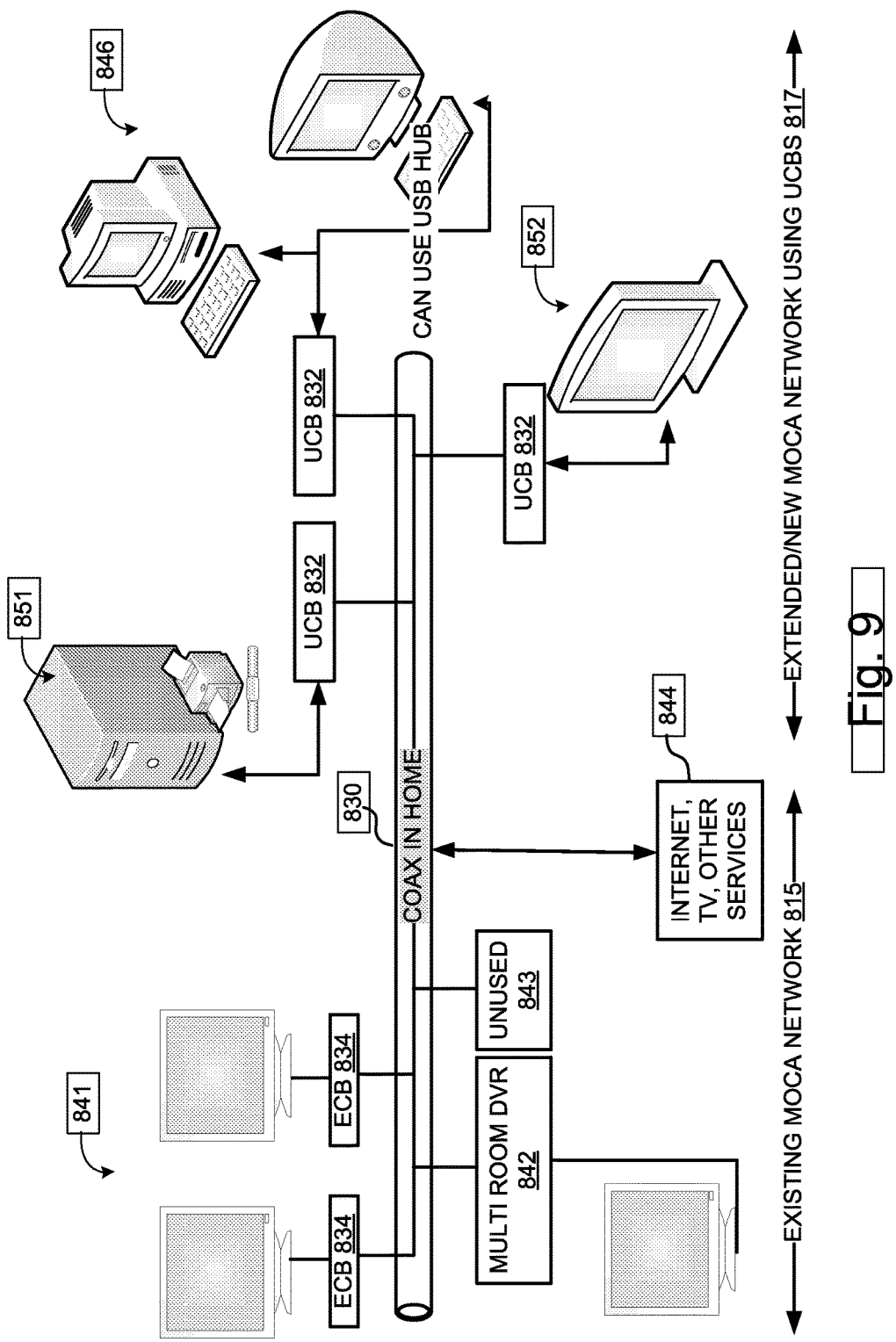
FIG. 9 is a diagram illustrating an example network in accordance with one embodiment of the technology described herein.

FIG. 9 is a diagram illustrating an example network in accordance with one embodiment of the technology described herein. The example illustrated in FIG. 9 depicts an example scenario of using USB-to-coaxial network bridges to enable USB devices (e.g., devices that cannot otherwise connect to the coaxial network) to connect to and transfer data across the coaxial network. The example in FIG. 9 shows an existing MoCA network 815 with a plurality of conventional MoCA nodes. Particularly, high definition televisions 841 are connected to the MoCA network utilizing Ethernet coaxial bridges 834 and a multiroom DVR 842. Available unused ports 843 are also illustrated in as are a connection for the Internet, television, or other services 844 that can be made available to the nodes over the mocha network.

This example also shows the extended mocha network 817 extended by the use of bridges. In this example, USB-coaxial bridges 832 are used, however, in other embodiments FireWire or other bridges can also be used. Here, a desktop computer 851 and a high definition television 852 are connected to the network via their respective USB-coaxial bridges 832. Also, a plurality of devices (in this instance computers) 846 are connected to the network via a single USB-coaxial bridge 832 using a USB hub. Accordingly, as this example illustrates, multiple USB devices (e.g. 851, 852, 846) can communicate across the mocha network to other nodes using the bridges.

Figure 10:
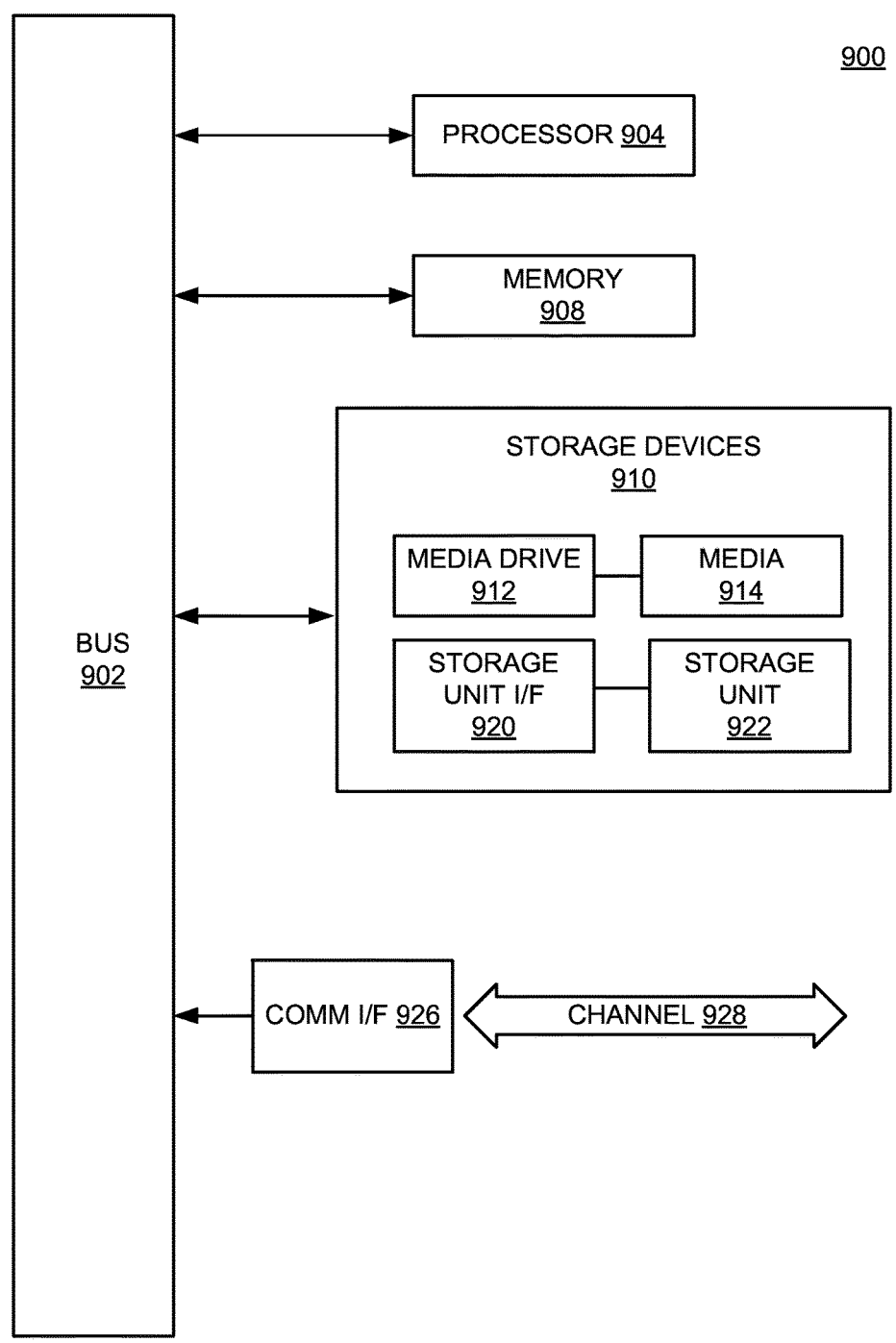
FIG. 10 illustrates an example computing module that may be used in implementing various features of embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 10. Various embodiments are described in terms of this example-computing module 900. After reading this description, it will become apparent to a person skilled in the relevant art how to implement the technology using other computing modules or architectures.

Referring now to FIG. 10, computing module 900 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 900 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 900 might include, for example, one or more processors, controllers, control modules, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing module 900 or to communicate externally.

Computing module 900 might also include one or more memory modules, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing module 900 might likewise include a read only memory ("ROM") or other static storage device coupled to bus 902 for storing static information and instructions for processor 904.

The computing module 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), or other removable or fixed media drive might be provided. Accordingly, storage media 914 might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing module 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory module) and memory slot, a PCMCIA slot and card, and other fixed or removable storage units 922 and interfaces 920 that allow software and data to be transferred from the storage unit 922 to computing module 900.

Computing module 900 might also include a communications interface 924. Communications interface 924 might be used to allow software and data to be transferred between computing module 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 900 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   receiving, via a first network bridge, an exploratory packet from a first universal serial bus (USB) device, wherein the first network bridge is operably coupled to a first bus and a coaxial network, and wherein the first USB device is operably coupled to the first bus, and wherein the first bus is compatible with a USB protocol;
   forwarding, via the first network bridge, a reply to the exploratory packet from a second USB device to the first USB device, wherein the second USB device is operably coupled to a second bus, and wherein the second bus is compatible with the USB protocol;
   receiving, via the first network bridge, a plurality of data frames over the first bus from the first USB device;
   combining, via the first network bridge, the received plurality of data frames into an aggregated frame;
   making, via the first network bridge, a reservation request to send the aggregated frame across the coaxial network;
   receiving, via the first network bridge, a bandwidth allocation from a network controller;
   addressing, via the first network bridge, the aggregated frame to allow the aggregated frame to be routed to the second USB device over the coaxial network; and
   sending, via the first network bridge, the aggregated frame to the second USB device over the coaxial network.

2. The method according to claim 1, wherein sending the aggregated frame to the second USB device comprises sending the aggregated frame to a second network bridge, wherein the second network bridge is operably coupled to the coaxial network and the second bus, and wherein the second network bridge is operable to route individual frames contained in the aggregated frame to the second USB device.

3. The method of claim 2, wherein the second network bridge is operable to remove a coaxial network header from the aggregated frame, de-aggregate individual frames contained in the aggregated frame, read address information associated with the de-aggregated individual frames, and transmit the de-aggregated individual frames to the second USB device based on the address information.

4. The method according to claim 1, comprising identifying, via the first network bridge, an identification of the second USB device based on header information in the received frames, wherein addressing comprises addressing the aggregated frame to the second USB device using an addressing protocol of the coaxial network.

5. The method of claim 1, wherein addressing comprises adding a coaxial network frame header to the aggregated frame, the coaxial network frame header including an IP or MAC address of the second USB device.

6. A method, the method comprising:
a first network bridge receiving a ping with an exploratory packet from a local universal serial bus (USB) device, wherein the first network bridge is operably coupled to a first bus and a coaxial network, and wherein the local USB device is operably coupled to the first bus, and wherein the first bus is compatible with a USB protocol;
the first network bridge broadcasting the exploratory packet across the coaxial network to probe for network USB devices;
the first network bridge receiving a reply from a remote USB device that is appropriate for a given transmission, wherein the remote USB device is operably coupled to a second bus, and wherein the second bus is compatible with the USB protocol;
the first network bridge receiving data frames from the local USB device via the first bus, wherein the received data frames are intended for transmittal to the remote USB device over the coaxial network;
the first network bridge combining the received data frames into an aggregated frame, making a reservation request to send the aggregated frame across the coaxial network, receiving a bandwidth allocation from a network controller, and addressing the aggregated frame to allow the aggregated frame to be routed to the remote USB device over the coaxial network; and
the first network bridge sending the aggregated frame to the remote USB device over the coaxial network.

7. The method according to claim 6, wherein the method comprises the first network bridge identifying, based on header information in the received frames, the remote USB device and, wherein the addressing comprises, based on this identification, addressing the aggregated frame to the remote USB device using an addressing protocol of the coaxial network.

8. The method according to claim 6, wherein addressing comprises adding a coaxial network frame header to the aggregated frame, the coaxial network frame header including an IP or MAC address of the remote USB device.

9. The method according to claim 6, wherein the method comprises a second network bridge receiving the aggregated frame from the first network bridge and routing individual frames contained in the aggregated frames to the remote USB device, wherein the second network bridge is operably coupled to the coaxial network and the second bus.

10. The method according to claim 9, wherein routing individual frames contained in the aggregated frames to the remote USB device comprises removing a coaxial network header from the aggregated frame, de-aggregating individual frames contained in the aggregated frame, reading address information associated with the de-aggregated individual frames, and transmitting the de-aggregated individual frames to the remote USB device associated with the address information.

11. A system comprising:
a first network bridge operably coupled to a first bus and a coaxial network, wherein the first bus is compatible with a universal serial bus (USB) protocol, and wherein the first network bridge is operable to:
receive an exploratory packet from a first USB device operably coupled to the first bus,
forward a reply to the exploratory packet from a second USB device to the first USB device, wherein the second USB device is operably coupled to a second bus compatible with the USB protocol,
receive a first plurality of data frames over the first bus from the first USB device,
combine the first plurality of data frames into a first aggregated frame,
make a reservation request to send the first aggregated frame across the coaxial network,
receive a bandwidth allocation from a network controller,
address the first aggregated frame to allow the first aggregated frame to be routed to the second USB device over the coaxial network, and
send the first aggregated frame to the second USB device over the coaxial network.

12. The system according to claim 11, wherein the first network bridge is operable to:
receive a second aggregated frame from the second USB device via a second network bridge, wherein the second network bridge is operably coupled to the coaxial network and the second bus.

13. The system of claim 12, wherein the first network bridge is operable to:
remove a coaxial network header from the second aggregated frame,
de-aggregate individual frames contained in the second aggregated frame,
read address information associated with the de-aggregated individual frames, and
transmit the de-aggregated individual frames to the first USB device based on the address information.

14. The system according to claim 13, wherein the first network bridge is operable to:
identify the first USB device based on header information in the de-aggregated individual frames.

15. The system of claim 11, wherein addressing comprises adding a coaxial network frame header to the second aggregated frame, the coaxial network frame header including an IP or MAC address of the first USB device.

16. A system, the system comprising:
a first network bridge operably coupled to a first bus and a coaxial network, wherein the first bus is compatible with a universal serial bus (USB) protocol, and wherein the first network bridge is operable to:
receive a ping with an exploratory packet from a local USB device operably coupled to the first bus,
broadcast the exploratory packet across the coaxial network to probe for network USB devices,
receive a reply from a remote USB device that is appropriate for a given transmission, wherein the remote USB device is operably coupled to a second bus compatible with the USB protocol,
receive data frames from the local USB device via the first bus, wherein the received data frames are intended for transmittal to the remote USB device over the coaxial network,
combine the received data frames into a first aggregated frame, make a reservation request to send the first aggregated frame across the coaxial network, receive a bandwidth allocation from a network controller, address the first aggregated frame to allow the first aggregated frame to be routed to the remote USB device over the coaxial network; and send the first aggregated frame to the remote USB device over the coaxial network.

17. The system according to claim 16, wherein the first network bridge is operable to:

identify the remote USB device based on header information in the received frames, and address the first aggregated frame to the remote USB device using an addressing protocol of the coaxial network.

18. The system according to claim 16, wherein addressing comprises adding a coaxial network frame header to the first aggregated frame, the coaxial network frame header including an IP or MAC address of the remote USB device.

19. The system according to claim 16, wherein the first network bridge is operable to:

receive a second aggregated frame from a second network bridge operably coupled to the coaxial network, and route individual frames contained in the second aggregated frame to the local USB device.

20. The system according to claim 19, wherein the first network bridge is operable to:

remove a coaxial network header from the second aggregated frame, de-aggregate individual frames contained in the second aggregated frame, read address information associated with the de-aggregated individual frames, and transmit the de-aggregated individual frames to the local USB device associated with the address information.

\* \* \* \* \*